J. CORBIN.
SPRING WHEEL.
APPLICATION FILED FEB. 23, 1911.

1,015,785.

Patented Jan. 30, 1912.

WITNESSES:
C. M. Shigley
Evelyn H. Stevens

INVENTOR.
JOSEPH CORBIN
BY
Thomas R. Harney
ATTORNEY.

UNITED STATES PATENT OFFICE.

JOSEPH CORBIN, OF COLUMBUS, OHIO.

SPRING-WHEEL.

1,015,785. Specification of Letters Patent. Patented Jan. 30, 1912.

Application filed February 23, 1911. Serial No. 610,120.

*To all whom it may concern:*

Be it known that I, JOSEPH CORBIN, a citizen of the United States, residing at 504 West Broad street, Columbus, in the county of Franklin and State of Ohio, have invented certain new and useful Improvements in Spring-Wheels, of which the following is a specification.

The present invention relates to spring wheels adapted for use in connection with automobiles and other vehicles, and is designed with special regard for lightness, strength and durability.

The essence of the invention resides in the spring spokes and necessary accessories by means of which all jars or concussions, and shocks due to faulty roads are absorbed before they reach the vehicle body.

The invention further consists in certain novel features of construction and combinations and arrangements of parts as will be hereinafter set forth.

In the accompanying drawings I have illustrated one example of the physical embodiment of my invention constructed according to the best mode I have so far devised for the practical application of the principles thereof.

Figure 1:
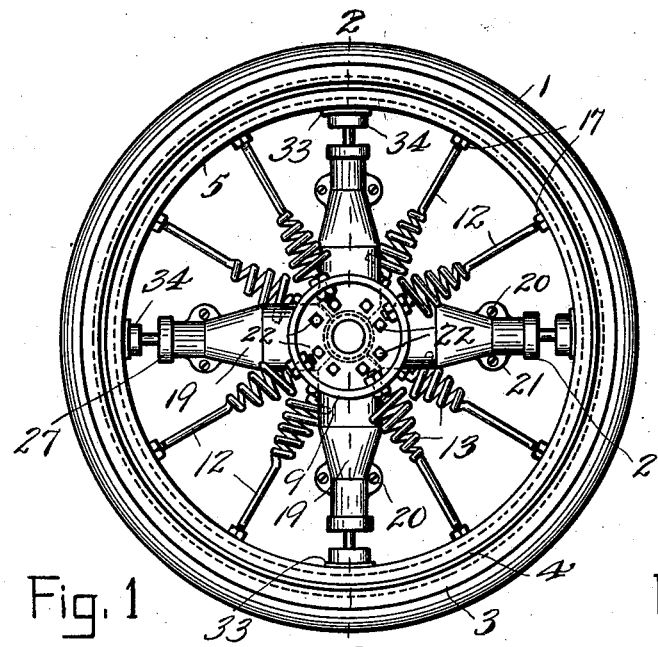
Figure 2:
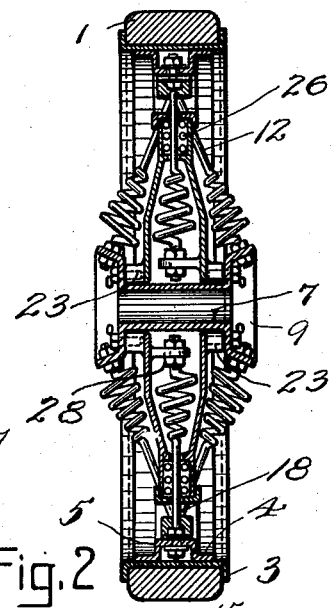
Figure 3:
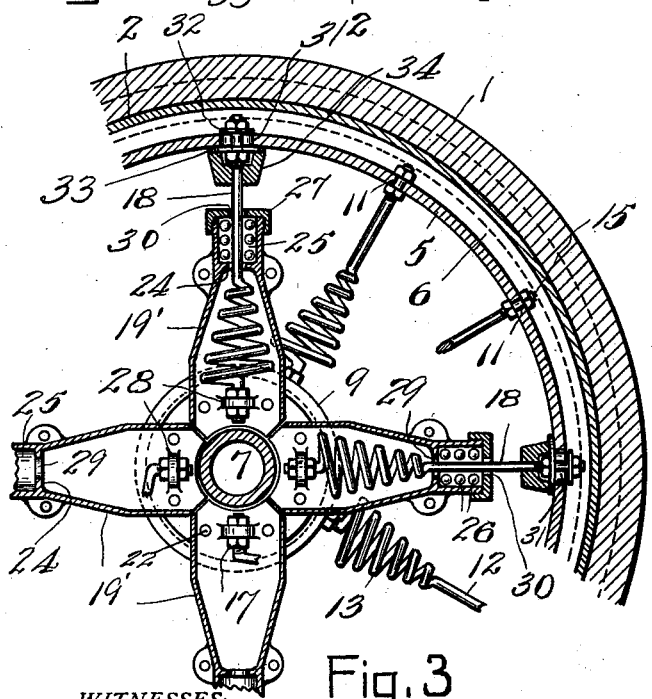
Figure 4:
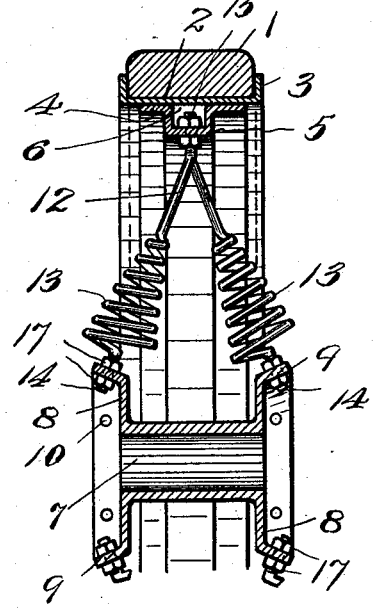

Figure 1 is a side elevation of a wheel embodying my invention. Fig. 2 is a transverse sectional view on line 2—2 Fig. 1. Fig. 3 is an enlarged vertical central sectional view of a portion of the wheel, showing spoke housings in detail, and Fig. 4 is a transverse sectional view of a portion thereof.

The rubber tire 1 of the wheel is incased within the metallic rim 2 which is fashioned with the usual flanges 3, 3, forming the channel for the tire.

Within the rim is secured the felly 4, which as clearly seen in the drawings, is formed with a central inwardly projecting hollow portion 5 constituting an annular chamber or space 6 for a purpose to be specified.

The central spool or hub 7 is of metal and formed with end plates 8, 8, from which are projected the flaring annular flanges 9, 9. The flanges 9, of the hub are perforated, as at 10, and the annular projection 5 of the felly is provided with perforations 11 complementary thereto, and between these perforated members the spokes 12 are suspended.

The spokes 12 are each provided with a helical, conical spring portion 13, and their ends 14 and 15 are threaded, the inner end 14 of each spoke being passed through the perforated flange of the hub, and the outer end 15 being passed through the opening 11 of the felly. Clamping nuts 17 serve to hold the threaded ends of the spokes in position. As illustrated in the drawings there are eight of these spokes 12, but it will be understood that the number may be varied to differing circumstances. The outer ends of the spokes are centered in the felly, but it will be seen that the inner end of each alternating spoke is attached to an opposing flange of the hub, (see Fig. 4) thus forming a pyramidal support between the hub and tire which insures strength.

In addition to the spokes 12 I utilize a series of perpendicularly arranged spokes 18 arranged on diametric-lines, and incased by the housings 19. The housings are made up of sections 19' secured together by bolts or screws 20 passed through the perforated ears 21. The housing sections are attached to the ends of the hub by means of the bolts 22 which are secured in the bosses 23 cast upon the outer side of the housing sections for this purpose. Near the outer end of each housing its sections are formed with an interior integral flange 24, the two complementary flanges forming a ball bearing cup 25 in which the anti-friction balls 26 are held about the spoke 18. A screw cap 27 closes the cup 25.

The spokes 18 are secured at their inner ends in the perforated ears 28 provided on one section of the spoke housings, their outer ends extend through perforations 29 and 30 in the bottom of the cup 25 and the screw cap 27 respectively; and their threaded ends are passed through slots or elongated openings 31 in the projection 5 of the felly. The clamping nuts of the spokes bear against the washers 32 and 33 which extend over the opening 31.

To provide a cushion for the housed spokes I attach a rubber bumper 34 to the inner, larger, washer 33 and this cushion is adapted to absorb shocks sustained and taken up by the spring spokes. The impact is made between the screw cap 27 and the cushion or bumper.

While I have illustrated four diametrically arranged shock absorbing spokes with a cushion, it will be understood of course that the number may be varied to suit exigencies that develop.

The ball bearings illustrated are for the purpose of supporting the spokes at their outer ends and taking up thrusts or lateral strains thereon, and the slotted openings 31 in the felly provide for any movement of the spokes at their ends.

From the above description taken in connection with the drawings it is evident that I have provided a well braced spring wheel having a broad or wide hub, the spokes diverging from the felly where they are securely held, and extending alternately to the opposing ends of the hub forming a pyramid construction to prevent collapse of the wheel.

The construction of the separate elements of the wheel permits an easy assemblage of the parts, and parts may be removed and substituted with facility.

Having thus fully described my invention, what I claim and desire to secure by Letters Patent is:—

1. The combination in a wheel with a recessed felly and a hub having end flanges, of spring spokes rigidly secured in the recessed felly and extending to alternate sides of the hub and secured to said flanges, a series of spring spokes having their outer ends movably attached in said felly, housings located on each movable spoke, a closed ball bearing cup at the end of each housing, and a cushion about the movable end of said spokes to receive shocks from the housings.

2. The combination with a wheel having a recessed felly and a hub formed with flaring end flanges, of a series of spring spokes having their outer ends attached to the felly in said recess and extending alternately to opposite sides of the hub, securing means for attaching the inner ends of the spokes to their respective flanges, and a series of perpendicular spring spokes having their outer ends secured in said recess, a housing about each perpendicular spoke attached to the hub, means for attaching the inner end of each perpendicular spoke to its housing, a bearing cup formed at the outer end of each housing and balls therein, a screw cap over each cup, and a cushion attached to the felly to absorb shocks from said housings.

In testimony whereof I affix my signature in presence of two witnesses.

JOSEPH CORBIN.

Witnesses:
C. M. SHIGLEY,
IDA A. EVANS.